United States Patent
Stewart et al.

(10) Patent No.: US 8,297,125 B2
(45) Date of Patent: Oct. 30, 2012

(54) MEDIA ISOLATED DIFFERENTIAL PRESSURE SENSOR WITH CAP

(75) Inventors: Carl Stewart, Plano, TX (US); Richard Alan Davis, Plano, TX (US); Gilberto Morales, Arlington, TX (US)

(73) Assignee: Honeywell International Inc., Morristown, NJ (US)

( * ) Notice: Subject to any disclaimer, the term of this patent is extended or adjusted under 35 U.S.C. 154(b) by 1027 days.

(21) Appl. No.: 12/126,494

(22) Filed: May 23, 2008

(65) Prior Publication Data
US 2009/0288492 A1    Nov. 26, 2009

(51) Int. Cl.
*G01L 13/02* (2006.01)
*G01L 15/00* (2006.01)
(52) U.S. Cl. .................. 73/716; 73/715; 73/721
(58) Field of Classification Search .............. None
See application file for complete search history.

(56) References Cited

U.S. PATENT DOCUMENTS

| | | | |
|---|---|---|---|
| 4,023,562 A * | 5/1977 | Hynecek et al. | 600/561 |
| 4,380,932 A | 4/1983 | Mott et al. | 73/749 |
| 4,942,383 A | 7/1990 | Lam et al. | |
| 5,184,107 A | 2/1993 | Maurer | |
| 5,257,547 A | 11/1993 | Boyer | |
| 5,264,820 A * | 11/1993 | Kovacich et al. | 338/42 |
| 5,437,189 A * | 8/1995 | Brown et al. | 73/721 |
| 5,522,267 A | 6/1996 | Lewis | |
| 5,557,972 A | 9/1996 | Jacobs et al. | |
| 5,589,703 A * | 12/1996 | Baskett | 257/419 |
| 5,600,071 A | 2/1997 | Sooriakumar et al. | |
| 5,646,072 A | 7/1997 | Maudie et al. | |
| 5,684,253 A | 11/1997 | Bonne et al. | 73/706 |
| 6,148,673 A | 11/2000 | Brown | |
| 6,150,681 A | 11/2000 | Allen | |
| 6,255,728 B1 * | 7/2001 | Nasiri et al. | 257/704 |
| 6,346,742 B1 * | 2/2002 | Bryzek et al. | 257/704 |
| 6,427,539 B1 * | 8/2002 | Chen et al. | 73/726 |
| 6,945,120 B1 * | 9/2005 | Marcus et al. | 73/756 |
| 6,959,607 B2 | 11/2005 | Wilda | 73/716 |
| 7,004,033 B2 | 2/2006 | Katayama | |
| 7,010,984 B2 | 3/2006 | Krog et al. | 73/716 |
| 7,028,552 B2 | 4/2006 | Obermeier | |

(Continued)

FOREIGN PATENT DOCUMENTS

JP         59005931         1/1984

(Continued)

*Primary Examiner* — Lisa Caputo
*Assistant Examiner* — Jermaine Jenkins
(74) *Attorney, Agent, or Firm* — Seager Tufte & Wickhem LLC (57) ABSTRACT

A differential pressure sensor includes two pressure ports for allowing media to pass into contact with both the top and bottom sides of the diaphragm. A silicon pressure sensor die can be attached between the pressure ports using die attach materials for sensing a differential pressure between the media to evaluate media differential pressure. A cap with an opening can be placed on topside of a diaphragm formed in the silicon pressure die. The silicon pressure die can include die bond pads that can be electrically connected to the diaphragm to output electrical signals. The cap can seal the die bond pads from the harsh media and route the electrical signals therein. Media can pass through the opening in the cap such that a media path to the top of the diaphragm is not exposed to the die bond pads of the silicon pressure die to ensure long-term sensor reliability.

23 Claims, 6 Drawing Sheets

U.S. PATENT DOCUMENTS

| | | | |
|---|---|---|---|
| 7,162,927 B1 | 1/2007 | Selvan et al. | 73/753 |
| 7,216,547 B1 * | 5/2007 | Stewart et al. | 73/756 |
| 7,219,551 B2 | 5/2007 | Suzuki | 73/718 |
| 7,252,007 B2 | 8/2007 | Ruohio et al. | |
| 7,343,080 B2 | 3/2008 | Gally et al. | |
| 7,401,525 B2 * | 7/2008 | Cobianu et al. | 73/754 |
| 7,436,037 B2 | 10/2008 | Kurtz et al. | |
| 7,526,963 B2 | 5/2009 | Wanami et al. | |
| 7,571,651 B2 | 8/2009 | Kim et al. | |
| 7,644,625 B2 * | 1/2010 | Ricks | 73/756 |
| 7,654,155 B2 | 2/2010 | Johansen et al. | |
| 7,763,487 B2 | 7/2010 | Villa et al. | |
| 7,765,978 B2 | 8/2010 | Ruesch et al. | |
| 7,775,117 B2 | 8/2010 | Kurtz | |
| 2006/0169048 A1 | 8/2006 | Suzuki | 73/716 |
| 2006/0260408 A1 | 11/2006 | Villa et al. | 73/715 |
| 2007/0044865 A1 | 3/2007 | Ruesch et al. | 141/301 |
| 2007/0114624 A1 | 5/2007 | Kurtz et al. | 257/419 |
| 2009/0288492 A1 | 11/2009 | Stewart et al. | |
| 2010/0122583 A1 | 5/2010 | Rozgo et al. | |

FOREIGN PATENT DOCUMENTS

| | | |
|---|---|---|
| JP | 06-026963 | 2/1994 |
| JP | 11258094 | 9/1999 |
| JP | 3863171 | 10/2006 |
| KR | 20080031969 | 4/2008 |

* cited by examiner

MEDIA ISOLATED DIFFERENTIAL PRESSURE SENSOR WITH CAP

TECHNICAL FIELD

Embodiments are generally related to pressure sensors. Embodiments are more particularly related to differential pressure sensors with a cap to seal media from bond pads. Embodiments are also related to differential pressure sensors for measuring a differential pressure of fluid media and the like.

BACKGROUND OF THE INVENTION

Many processes and devices can be utilized for pressure sensing applications. Pressure sensors or pressure transducers can be used in a wide range of sensing applications. In many cases, it can be desirable to measure the pressure of fluid media such as water, fuel, oil, acids, bases, solvents and corrosive gases. The fluid media can also include, but is not limited to air, nitrogen, industrial process gases, water, automotive fluids, pneumatic fluids, coolants and industrial chemicals. For such applications, differential pressure sensors can be utilized for accurately sensing the pressure of the fluid media. Such differential pressure sensors can be made using well-known semiconductor technology. The most common differential pressure sensors can be solid-state silicon pressure sensors including a thin silicon diaphragm that is stressed in response to an applied pressure. The stress can be measured by piezoresistive elements formed in the silicon diaphragm. The measured stress can be calculated to measure the pressure of the fluid media.

In addition, the differential pressure sensors can incorporate a silicon pressure sensor die to exhibit a high degree of accuracy. The differential pressure sensors can also include two pressure ports in order to sense difference in pressure between the two ports for calculating the media pressure. Such differential pressure sensors typically require fluid media on both the top and bottom sides of the diaphragm in such a way that the diaphragm of the differential pressure sensor can come into contact with the media that can be corrosive or harmful. This corrosive or harmful media can damage other components of the pressure sensors, in particular bond pads that are exposed for wire bonding the differential pressure sensor to the package.

In many applications, the media can create a harsh environment for the exposed bond pads, which can results in long-term reliability failures. Therefore, the differential pressure sensors should preferably be constructed in such a way that it can be resistant to the media or be physically isolated from the media for measuring the media pressure. Thus, differential pressure sensors can either be inadequately protected for media compatibility or used with additional hardware that becomes prohibitively expensive for many applications. Hence, it would be desirable to isolate areas that could be damaged by media exposure such as the bond pads and wire bonds from direct contact with the media for reliable operation.

In some isolation arrangements of the differential pressure sensors, the environmentally sensitive silicon pressure die can be sandwiched between an elastomeric media seal and a conductive elastomeric pad contained within a housing. The pressure sensors can utilize the pre-molded elastomeric seals to separate the pressure die from a relatively harsh, wet, pressure sensing environment. Such pressure sensors can obtain true differential operation of the sensors and an accurate pressure of the media, but can increase production cost of the sensors.

In the majority of prior art, the differential pressure sensors can provide advance media isolation arrangements, but can require additional costs in construction of isolation sections. Thus, the manufacturing expense of pressure sensors can be increased and also, the accuracy of the pressure sensors can be reduced. It is highly desirable to provide a media compatible differential pressure sensor that can exhibit substantial advantages of reliability and performance without increasing the production costs over existing technologies.

A need therefore exists for an improved differential pressure sensor with high reliability, which can provide media isolated electrical connections that are ultimately more efficient and sturdier than presently implemented pressure sensors. Such differential pressure sensors are described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved differential pressure sensor with a cap that can overcome the aforementioned drawbacks.

It is another aspect of the present invention to provide for an improved differential pressure sensor with media isolated electrical connections.

The aforementioned aspects and other objectives and advantages can now be achieved as described herein. A differential pressure sensor includes two pressure ports for allowing media to pass through a cavity formed therein. A silicon pressure sensor die can be attached at one of the pressure ports using die attach materials for sensing a differential pressure between the media to evaluate media pressure. A cap with an opening can be placed on topside of a diaphragm formed in the silicon pressure die. The silicon pressure die can include die bond pads that can electrically connect to the diaphragm to output electrical signals. The cap can isolate the die bond pads from the harsh media and route the electrical signals under the cap. Media can therefore pass through the ports and within the opening in the cap such that the die bond pads are not exposed to the media path of the silicon pressure die, thereby providing long-term sensor reliability.

In accordance with another feature of the present invention, a cap can be bonded using methods known to those with knowledge in the art over the diaphragm of the silicon pressure die. The diaphragm can be made of thin silicon. The die attach materials can be applied on the pressure ports such that the pressure ports are attached to the cap and the silicon pressure die, respectively. In addition, the silicon pressure die bond pads can be isolated from the media by the silicon cap. The diaphragm can be deformed in accordance with the pressure applied by the media. The deformation can be measured by piezoresistive elements doped on a surface of the diaphragm. The piezoresistive elements can convert the deformation of the diaphragm into electrical signals using well-known piezoresistive principles in order to compute the pressure in the media.

The differential pressure sensor can be utilized in a wide range of sensing applications to evaluate the pressure in the media, including but not limited to water, fuel, oil, acids, bases, solvents and corrosive gases. The present invention can utilize the cap to seal the media such that entry of the media into the bond pads can be prevented. Thus, the creation of harsh environment for the exposed bond pads by the media can be reduced. Therefore, such differential pressure sensor can achieve highly accurate and reliable detection of a differential pressure of the media with high measurement range and without increasing the production cost.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein. The example described here is using a silicon cap wafer frit bonded to the silicon pressure sensor wafer. Another embodiment could use a glass cap wafer anodic bonded to the silicon pressure sensor wafer. Other cap wafer materials or bonding methods known to those with knowledge of the art could also be used.

DETAILED DESCRIPTION

The particular values and configurations discussed in these non-limiting examples can be varied and are cited merely to illustrate at least one embodiment and are not intended to limit the scope thereof. The example described here is using a silicon cap wafer frit bonded to the silicon pressure sensor wafer. Another embodiment could use a glass cap wafer anodic bonded to the silicon pressure sensor wafer. Other cap wafer materials or bonding methods known to those with knowledge of the art could also be used.

Figure 1:
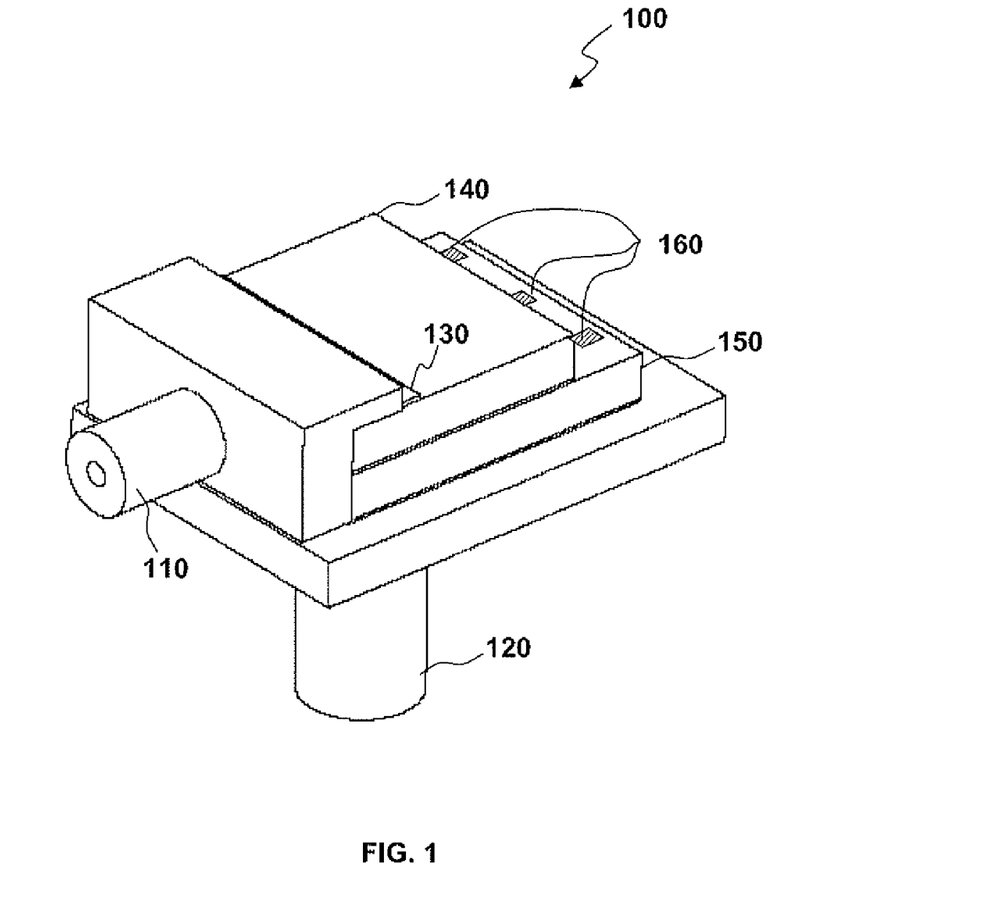
FIG. 1 illustrates an assembled view of a differential pressure sensor, which can be adapted for use in implementing a preferred embodiment.

Note that in FIGS. 1-6 identical or similar parts or elements are generally indicated by identical reference numerals. Referring to FIG. 1 an assembled view of a differential pressure sensor 100 is illustrated, which can be adapted for use in implementing a preferred embodiment. The differential pressure sensor 100 comprises two pressure ports 110 and 120 that can be utilized for allowing media to pass there through. The two pressure ports 110 and 120 can be made using metal, thermoplastic or other material. The two pressure ports 110 and 120 can also comprise an injection molded plastic portion. Pressure port 110 can be adhesively connected to a silicon cap 140 using a die attach material 130. Cap 140 keeps the pressurizing media away from the bond pads 160. In the differential pressure sensor 100, one of the pressure ports 110 and 120 can be attached on side of the silicon cap 140, such that the two pressure ports 110 and 120 can generally be angled at 90 degrees. The die attach material 130 can be adhesive and/or made of silicone. The die attach material 130 can be utilized for isolating stress in the differential pressure sensor 100 and for attaching the pressure ports 110 and 120 at the silicon cap 140 and a silicon pressure die 150.

Each pressure port 110 and 120 can carry the media at different pressures. The differential between pressures in each pressure ports 110 and 120 can be measured by contacting the media with the silicon pressure die in order to calculate the pressure in the media in such a way that the differential pressure sensor 100 can provide the differential pressure in the media. The media can include, but is not limited to, water, fuel, oil, acids, bases, solvents and corrosive gases.

Figure 2:
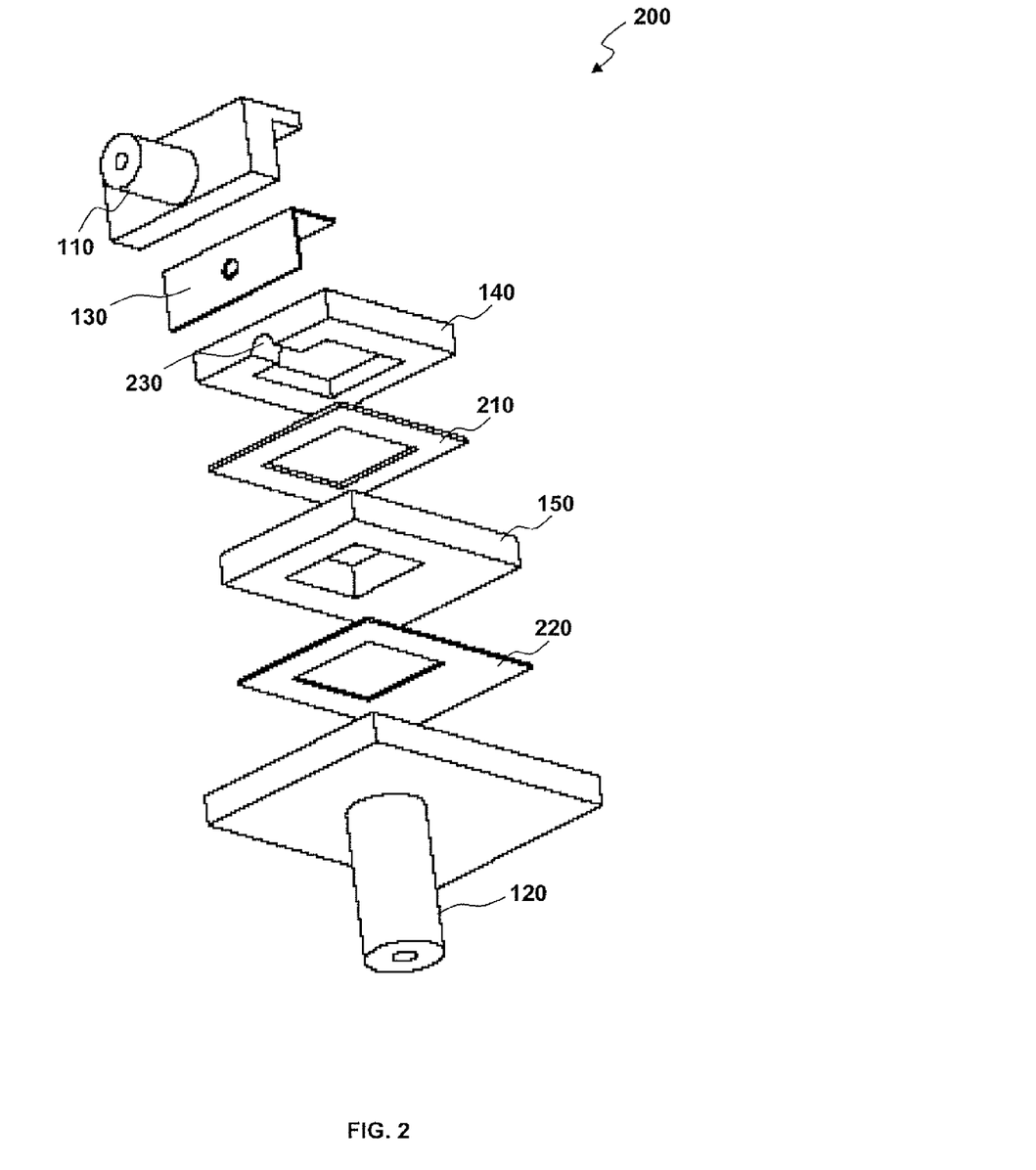
FIG. 2 illustrates an exploded view of the differential pressure sensor as shown in FIG. 1, which can be implemented in accordance with a preferred embodiment.

Referring to FIG. 2 an exploded view of the differential pressure sensor 200 as shown in FIG. 1 is illustrated. The two pressure ports 110 and 120 of the differential pressure sensor 200 can be respectively and hermetically bonded to the silicon cap 140 and the silicon pressure die 150 using the die attach materials 130 and 220. The silicon cap 140 can include an opening or hole 230 on the side in such a manner that the media from the pressure port 110 is applied through the opening 230 of the silicon cap 140. The silicon cap 140 can be bonded to an upper surface of the silicon pressure die 150 using a frit glass 210 at a temperature ranging between 25° C. and 550° C. In a bottom surface of the silicon pressure die 150, the pressure port 120 can be firmly attached.

Frit glass 210 can form a glass frit bonding between the silicon cap 140 and the silicon pressure die 150. The glass frit bonding can minimize thermal mismatch created by an anodic bonded glass. Such glass frit bonding materials can be highly desirable for high performance devices, in particular pressure sensors 200. Depending on the particular application, the quality of a bonding method can be judged by the criteria such as bonding precision, mechanical strength, optical properties, and thermal properties. The glass frit bonding can be done at a much higher temperature than the operating temperature of the differential pressure sensor 200, which creates a high-temperature rated interface. Thus, the differential pressure sensor 200 can improve the accuracy of the sensing output signal.

The silicon pressure die 150 can be provided in the form of a rectangular die with an opening therein; however, is can be appreciated that a specific geometric shape is not required. The silicon pressure die 150 can receive the different media through its upper and bottom surface from the respective pressure ports 110 and 120. The silicon pressure die 150 can function to compute the media pressure by measuring the differential pressure between the different media from the pressure ports 110 and 120. Silicon pressure die 150 can be protected by the silicon cap 140 in order to avoid entry of the media into the bond pads 160 and electrical connections of the silicon pressure die 150.

Figure 3:
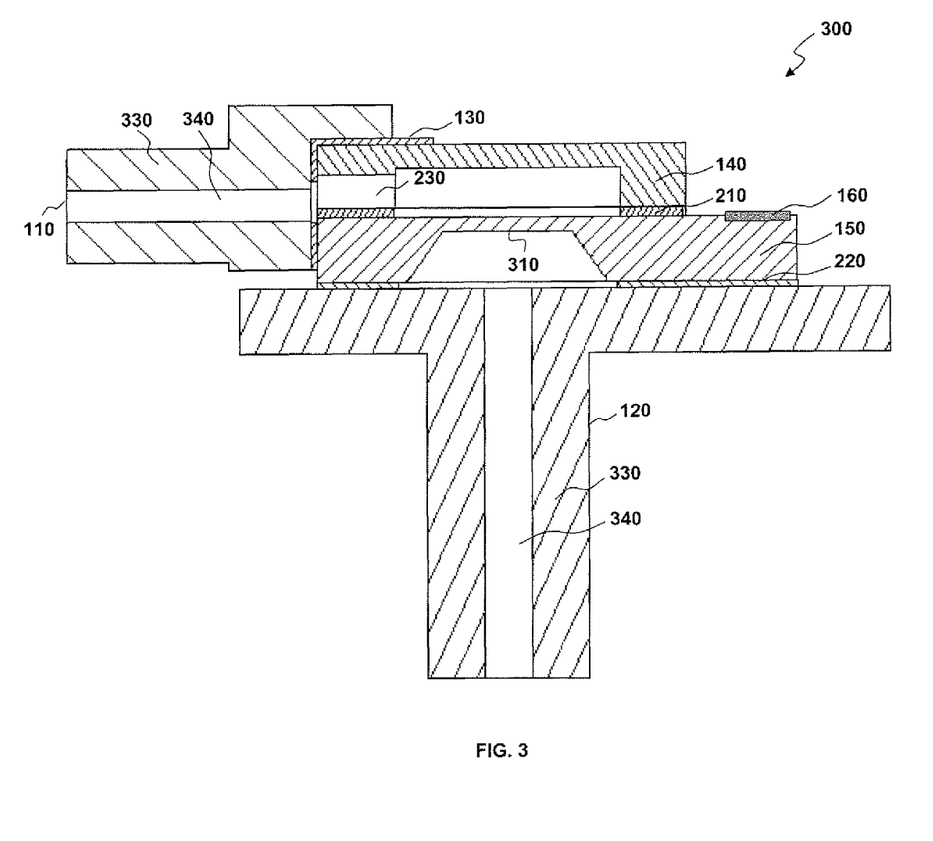
FIG. 3 illustrates a cross sectional view of the differential pressure sensor as shown in FIG. 1, which can be implemented in accordance with a preferred embodiment.

Referring to FIG. 3 a cross sectional view of the differential pressure sensor 300 as shown in FIG. 1 is illustrated. In such differential pressure sensor 300, the silicon pressure die 150 can include a diaphragm 310 and multiple bond pads 160 therein. The diaphragm 310 can be utilized for sensing the pressure applied by the media. The diaphragm 310 can exhibit a relatively thin thickness of less than about 0.05 mm and typically be a silicon diaphragm. The diaphragm 310 can be made of many thin materials in order to measure even very minute pressure in the media. The wire or die bond pads 160 can be formed on the topside of the die 150.

Bond pads 160 can be placed on the die 150 in accordance with semiconductor processing method and technology. The bond pads 160 should be formed with a predetermined length to conduct electricity. The diaphragm 310 can be incorporated with piezoresistive elements (not shown) that can react to the stress or media pressure applied on the diaphragm. The piezoresistive elements can convert the applied pressure into an electrical signal using well-known piezoresistive principles. The bond pads 160 can be integrated on such piezoresistive elements. The bond pads 160 can provide an external electrical connection for the diaphragm. Such bond pads 160 can be made of aluminum, gold or other materials known to those with knowledge of the art.

Each pressure port 110 and 120 can be incorporated with a metal or plastic part 330 and a cavity 340. The cavity 340 can be formed within the pressure ports 110 and 120 and can be surrounded by the internal metal or plastic part 330. The cavity 340 can be formed as a passage through the metal or plastic part 330 of the pressure ports 110 and 120. The media to be measured can be passed through the cavity 340 of the pressure ports 110 and 120. In addition, the silicon pressure die 150 with the diaphragm 310 and the multiple bond pads 160 can be covered or capped by the silicon cap 140. The silicon cap 140 can seal the media from the bond pads 160 in order to avoid creation of harsh environment for the exposed bond pads 160. Thus, the differential pressure sensor 300 can result in long-term reliability and accuracy in the media pressure sensing.

Figure 4:
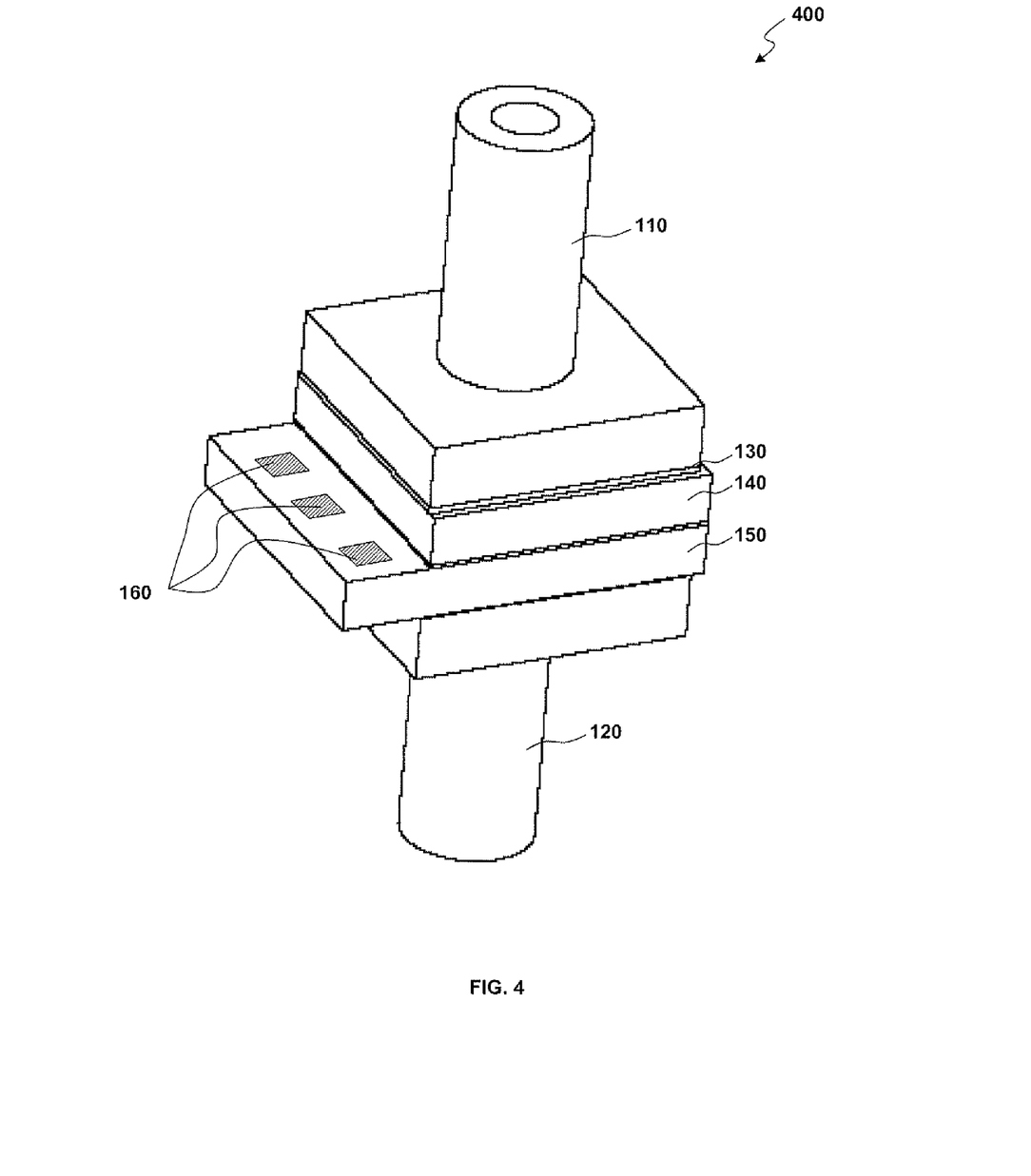
FIG. 4 illustrates an assembled view of another type of differential pressure sensor, which can be implemented in accordance with an alternative embodiment.

Referring to FIG. 4 an assembled view of another configuration of differential pressure sensor 400 is illustrated, which can be implemented in accordance with an alternative embodiment. In this type of differential pressure sensor 400, the two pressure ports 110 and 120 can be placed in a vertical fashion, i.e., the pressure port 110 can be placed on the topside of the silicon cap 140. The pressure ports 110 and 120 can be a hollow tube to provide a free flow of the media through the cavity 340 in the pressure ports 110 and 120. The silicon cap 140 and the silicon pressure sensor die 150 can be attached to the pressure ports 110 and 120 in an edge-aligned fashion.

Figure 5:
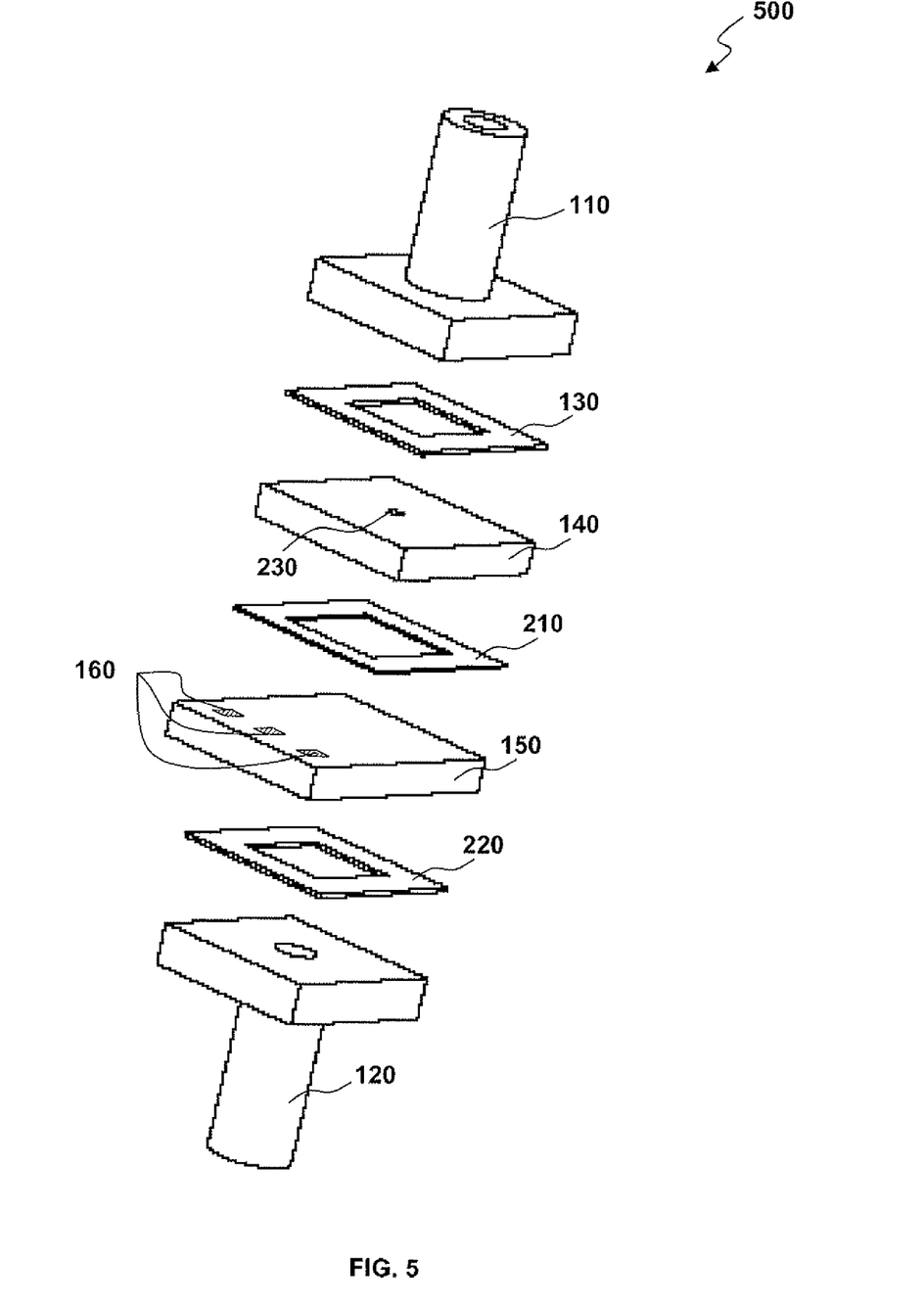
FIG. 5 illustrates an exploded view of the differential pressure sensor as shown in FIG. 4, which can be implemented in accordance with an alternative embodiment.

Referring to FIG. 5 an exploded view of the differential pressure sensor 500 shown in FIG. 4 is illustrated. In the differential pressure sensor 500, the silicon cap 140 can be provided with a hole or opening 230 in a central portion thereof. The media can pass through the differential pressure sensor 500 in straight line, since the two pressure ports can be aligned at the vertical fashion. The silicon cap 140 and the silicon pressure sensor die 150 can more preferably be designed in rectangular shape. The silicon cap 140 and the silicon pressure die 150 can be adhesively bonded with the respective pressure ports 110 and 120 and with the help of corresponding die attach materials 130 and 220. The die attach materials 130 and 220 can be selected in a suitable way that it should not affect the characteristics of the silicon cap 140 and the silicon pressure die 150.

Figure 6:
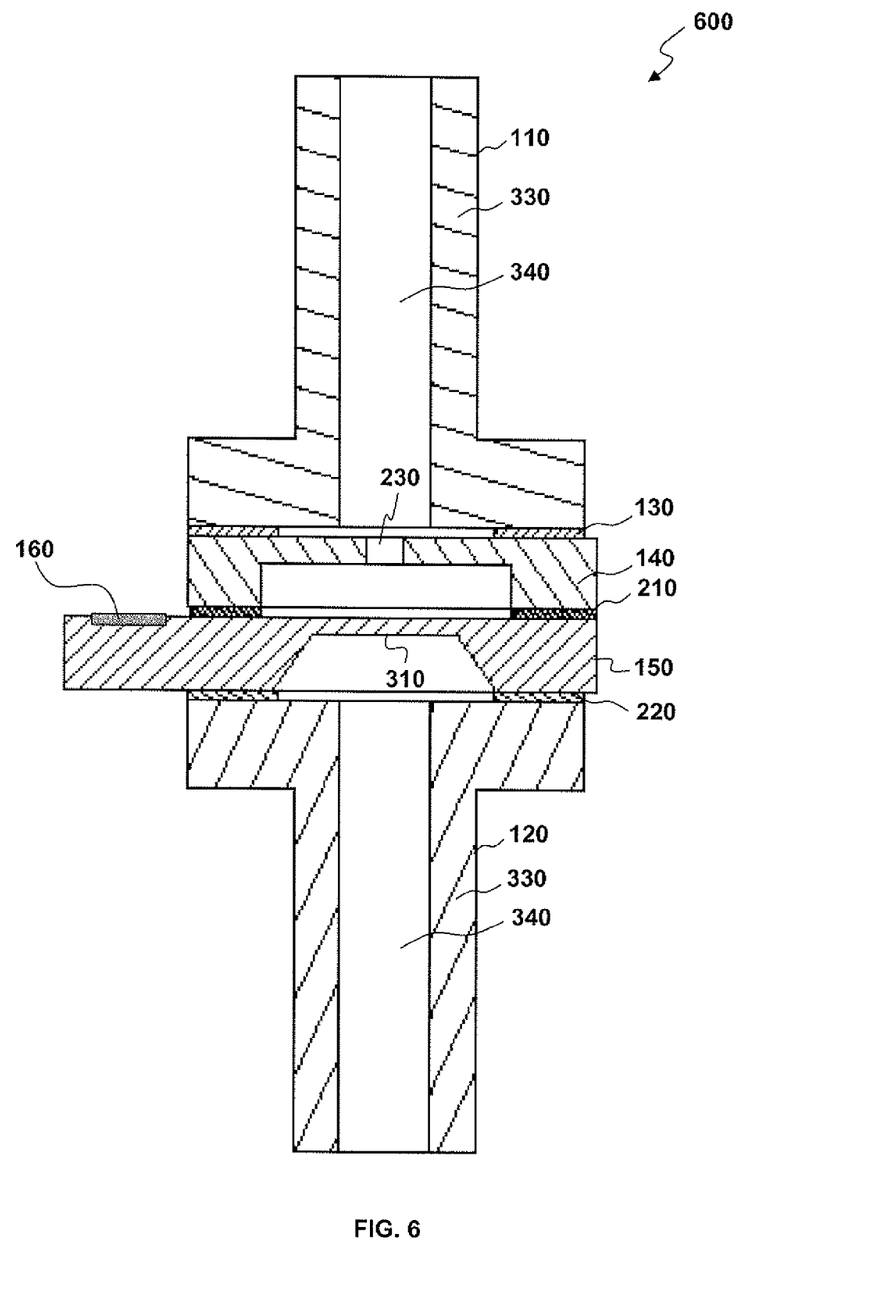
FIG. 6 illustrates a cross sectional view of the differential pressure sensor as shown in FIG. 4, which can be implemented in accordance with an alternative embodiment.

Referring to FIG. 6 a cross sectional view of the differential pressure sensor 600 as shown in FIG. 4 is illustrated. The diaphragm 310 can be placed on the bottom side of the silicon cap 140 and formed on the upper surface of the silicon pressure die 150 using well-known semiconductor fabrication technology. The pressure of the harsh media can be applied on the top and bottom sides of the diaphragm 310. The diaphragm 310 can further include a predetermined diaphragm thickness and length. The size of the silicon pressure die 150 can be minimized by reducing the diaphragm length and the circuitry area.

The silicon pressure die 150 can also include the bond pads 160 that are formed on the top surface thereof. The bond pads 160 can be electrically connected to the piezoresistive elements (not shown) formed in the diaphragm 310 with the help of metal runners (not shown) on the topside of the silicon pressure die 150. The thin frit glass 210 can provide a sealed cavity over the diaphragm 310 in the silicon pressure die 150.

The silicon pressure die 150 can be molded on a silicon wafer (not shown). The die bond pads 160 can be encapsulated by capping the topside of the diaphragm 310 using the silicon cap 140. Electrical signals of the die bond pads 160 can be routed under the silicon cap 140. The silicon cap 140 can completely seal the bond pads 160 from the harsh media in order to provide media isolated electrical connections. Thus, the differential pressure sensor 600 can provide a highly reliable sensing output.

The differential pressure sensor 600 can apply media on both the top and bottom sides of the diaphragm 310 for measurement, recording and analysis. Electronic systems utilized for obtaining measurements from the differential pressure sensor 600 for further analysis and recording are well known to those skilled in the art. Such differential pressure sensors 100, 200, 300, 400, 500 or 600 can utilize the silicon cap 140 to prevent the topside of the sensor pressure die 150, in particular bond pads 160, from the harsh or corrosive media, which provides a more robust and reliable sensing output.

The differential pressure sensor can be designed using a semiconductor technology.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A differential pressure sensor, comprising:
   a pressure sensor die having a pressure sensor with a sensing diaphragm, the pressure sensor die further having a first side and a second side with a plurality of die bond pads formed on the first side of the pressure sensor die;
   a cap including a top and adapted to cover said pressure sensor and isolate said pressure sensor from said die bond pads, said cap having an opening formed in the top, wherein a measured media can pass through the opening in said cap and reach said diaphragm of said pressure sensor while the cap isolates the bond pads from the measured media; and
   a first port at least partially coupled to said cap, and a second port at least partially coupled to the second side of said pressure sensor die, wherein said first port and second port are configured to allow the measured media to contact said first side and said second side, respectively, of said diaphragm of said pressure sensor.

2. The differential pressure sensor of claim 1, further comprising piezoresistive elements doped on at least one side of said diaphragm.

3. The differential pressure sensor of claim 2, wherein said piezoresistive elements convert a differential pressure across the diaphragm into one or more electrical signals based on piezoresistive principles.

4. The differential pressure sensor of claim 2, wherein said die bond pads are electrically connected to said piezoresistive elements.

5. The differential pressure sensor of claim 1, wherein said cap is bonded to the first side of said pressure sensor die.

6. The differential pressure sensor of claim 1, wherein one or more die attach materials are interposed and used to attached said first and second ports to said cap and the second side of said pressure sensor die, respectively.

7. The differential pressure sensor of claim 1, wherein the measured media passes through said first port, through the opening in said cap and to the diaphragm, such that said die bond pads of the pressure sensor die are not exposed to the measured media path formed thereby.

8. The differential pressure sensor of claim 1, wherein said plurality of die bond pads are electrically connectable to provide output electrical signals from the differential pressure sensor.

9. The differential pressure sensor of claim 1, wherein said diaphragm comprises a thin silicon material.

10. The differential pressure sensor of claim 1, wherein said diaphragm is configured to become deformed in accordance with a pressure applied to the diaphragm by said measured media.

11. A differential pressure sensor, comprising:
a pressure sensor die having a pressure sensor with a sensing diaphragm, the pressure sensor die further having a first side and a second side with a plurality of die bond pads formed on the first side, the diaphragm having one or more piezoresistive elements;
a cap including a top and adapted to cover said pressure sensor and isolate said pressure sensor from said die bond pads, said cap bonded to the first side of said pressure sensor die over said diaphragm, said cap having an opening formed in the top, wherein said cap isolates said measured media from the bond pads of said pressure sensor die; and
a first port at least partially stemming from said cap and a second port at least partially stemming from the second side of said pressure sensor die, wherein said first port and second port are configured to allow media to contact said first side and said second side of said diaphragm of said pressure sensor.

12. The differential pressure sensor of claim 11, wherein said cap is bonded to the first side of said pressure sensor die.

13. The differential pressure sensor of claim 11, wherein die attach materials are used to attached said first port to said cap and the second port to the second side of said pressure sensor die.

14. The differential pressure sensor of claim 11, wherein the measured media passes through said first port, through the opening in said cap and to said diaphragm, such that said die bond pads are not exposed to the measured media path formed thereby.

15. The differential pressure sensor of claim 11, wherein said plurality of die bond pads are electrically connectable to provide output electrical signals from the differential pressure sensor.

16. The differential pressure sensor of claim 11, wherein said diaphragm comprises a thin silicon material.

17. The differential pressure sensor of claim 11, wherein said diaphragm is configured to become deformed in accordance with a pressure applied by said measured media.

18. The differential pressure sensor of claim 11, wherein said piezoresistive elements convert the differential pressure into one or more electrical signals based on piezoresistive principles.

19. The differential pressure sensor of claim 11, wherein said die bond pads are electrically connected to said piezoresistive elements.

20. A differential pressure sensor, comprising:
a silicon pressure sensor die having a silicon pressure sensor with a sensing diaphragm, the silicon pressure sensor die further having a first side and a second side with a plurality of die bond pads formed on the first side of said silicon pressure sensor die, the silicon pressure sensor configured to convert a differential pressure imposed by a measured media on the diaphragm into one or more electrical signals that are representative of the differential pressure;
a cap including a top and adapted to cover said silicon pressure sensor and isolate said silicon pressure sensor from said die bond pads, said cap bonded to the first side of said silicon pressure sensor die over said diaphragm and having an opening formed in the top;
a first port at least partially stemming from said cap, and a second port at least partially stemming from the second side of said silicon pressure sensor die, wherein said first port and second port are configured to allow the measured media to contact said first side and said second side of said diaphragm of said silicon pressure sensor; and
wherein said measured media passes through the said first port, through the opening in the cap and to the diaphragm, such that said die bond pads are not exposed to the measured media path formed thereby.

21. The differential pressure sensor of claim 20, wherein said cap is bonded to the first side of said silicon pressure sensor die over said diaphragm.

22. The differential pressure sensor of claim 20, wherein die attach materials are used to attached said first port to said cap and the second port to the second side of said silicon pressure sensor die.

23. The differential pressure sensor of claim 20, wherein said plurality of die bond pads are electrically connectable to provide output electrical signals from the differential pressure sensor.

* * * * *